(12) United States Patent
Chicahuala et al.

(10) Patent No.: US 10,093,217 B2
(45) Date of Patent: Oct. 9, 2018

(54) MOVABLE FRAME INCLUDING GANTRY

(71) Applicants: Antu Eduardo Chicahuala, Acheson (CA); Daniel Chicahuala, Acheson (CA)

(72) Inventors: Antu Eduardo Chicahuala, Acheson (CA); Daniel Chicahuala, Acheson (CA)

( * ) Notice: Subject to any disclaimer, the term of this patent is extended or adjusted under 35 U.S.C. 154(b) by 225 days.

(21) Appl. No.: 15/175,447

(22) Filed: Jun. 7, 2016

(65) Prior Publication Data

US 2017/0349076 A1    Dec. 7, 2017

(51) Int. Cl.
*B60P 1/02* (2006.01)
*B66C 5/02* (2006.01)

(52) U.S. Cl.
CPC . *B60P 1/02* (2013.01); *B66C 5/02* (2013.01)

(58) Field of Classification Search
CPC ..... B66C 19/005; B66C 19/007; B66C 19/02; B66C 5/02; B60P 1/02; A61G 19/00
USPC .................. 212/324, 272–274; 414/459–460
See application file for complete search history.

(56) References Cited

U.S. PATENT DOCUMENTS

| | | | | |
|---|---|---|---|---|
| 2,259,558 A * | 10/1941 | Evans | ................... | B66C 19/005 180/211 |
| 2,978,128 A | 4/1961 | Polich | | |
| 3,335,875 A | 8/1967 | Fachinetti | | |
| 3,348,711 A * | 10/1967 | Gove | ................... | B60P 1/6445 280/656 |
| 3,688,931 A * | 9/1972 | Hans Tax | ............... | B66C 19/007 414/460 |
| 3,721,358 A * | 3/1973 | Brock | ....................... | B60P 3/00 212/326 |
| 3,874,719 A * | 4/1975 | Goyarts | ................ | B66C 19/007 414/460 |
| 4,049,143 A | 9/1977 | Hatakka et al. | | |
| 4,423,885 A | 1/1984 | Carney et al. | | |
| 4,573,853 A * | 3/1986 | Lorenz | ...................... | B66F 3/46 212/314 |
| 4,619,340 A * | 10/1986 | Elmer | ..................... | B60G 17/04 172/413 |
| 5,114,295 A * | 5/1992 | Jansson | ................. | B66C 19/007 212/326 |
| 5,839,874 A * | 11/1998 | Johnston | ............... | B66C 19/005 414/459 |
| 6,071,068 A | 6/2000 | Smith et al. | | |
| 6,932,372 B2 | 8/2005 | French et al. | | |
| 7,371,038 B2 * | 5/2008 | Tuvim | .................... | B60P 1/025 414/459 |

(Continued)

FOREIGN PATENT DOCUMENTS

| CA | 2218844 | 7/2001 |
|---|---|---|
| CN | 202729631 | 2/2013 |
| CN | 203855359 | 10/2014 |

OTHER PUBLICATIONS

"TowHaul Drag line Bucket Transprt System" retrieved from http://www.towhaul.com/products/bucket-transporter Jun. 6, 2016.

*Primary Examiner* — Mark C Hageman

(57) ABSTRACT

An apparatus includes a height-adjustable gantry assembly configured to be securely connected to a gantry load resting on a working surface. The height-adjustable gantry assembly, in use, lifts and supports the gantry load vertically above the working surface. A movable frame assembly is configured to move and support the height-adjustable gantry assembly.

18 Claims, 10 Drawing Sheets

(56) References Cited

U.S. PATENT DOCUMENTS

| | | |
|---|---|---|
| 7,520,524 B2 | 4/2009 | Smith |
| 7,866,933 B2 * | 1/2011 | Welch .................. B60P 1/6445 414/458 |
| 8,215,423 B2 | 7/2012 | Terry |
| 8,459,685 B2 | 6/2013 | Wood et al. |
| 8,465,040 B2 | 6/2013 | Skalbeck et al. |
| 2003/0180132 A1 * | 9/2003 | Morreim ............... B66C 19/005 414/458 |

* cited by examiner

MOVABLE FRAME INCLUDING GANTRY

TECHNICAL FIELD

This document relates to the technical field of (and is not limited to) an apparatus including a height-adjustable gantry assembly mounted to a movable frame assembly (and method therefor).

BACKGROUND

A gantry is a structure configured to straddle an object or a workspace. The gantry straddles an empty space. The gantry supports a gantry crane (also called an overhead crane) that straddles the workload. The gantry is configured to vertically lift a load from the workspace.

SUMMARY

It will be appreciated that there exists a need to mitigate (at least in part) at least one problem associated with the existing gantry systems (also called the existing technology). After much study of the known systems and methods with experimentation, an understanding of the problem and its solution has been identified and is articulated as follows:

For the case where a known gantry is mounted to a movable frame, the known gantry, in use, may permit a gantry load (that is supported by the known gantry) to freely swing from side-to-side and/or from front to back while (A) the gantry load is held above a working surface, and (B) the movable frame moves the gantry and the gantry load. This situation may lead to inadvertent or unwanted damage to the gantry, the movable frame and/or to users.

Currently, mining companies use cranes and trailers to move equipment that is broken or needs maintenance and/or relocation. This sort of operation costs a lot of money as the cost rates for cranes and heavy haul trailers are relatively high.

What is needed is a solution for the above situation.

To mitigate, at least in part, at least one problem associated with the existing technology, there is provided (in accordance with a major aspect) an apparatus.

The apparatus includes a height-adjustable gantry assembly configured to be securely connected to a gantry load resting on a working surface. The height-adjustable gantry assembly is also configured to be height adjusted. This is done in such a way that the height-adjustable gantry assembly, in use, lifts and supports the gantry load vertically above the working surface once the height-adjustable gantry assembly is securely connected to the gantry load. A movable frame assembly is configured to move and support the height-adjustable gantry assembly. This is done in such a way that the movable frame assembly moveably supports the height-adjustable gantry assembly and the gantry load once the movable frame assembly has moved the height-adjustable gantry assembly proximate to the gantry load, and once the height-adjustable gantry assembly is securely connected to the gantry load. The height-adjustable gantry assembly is also configured to maintain the gantry load in a substantially stationary position relative to the movable frame assembly once the movable frame assembly is made to move relative to the working surface.

By using the apparatus (also called a mobile hydraulic gantry trailer system), costs may be reduced for moving equipment and machinery components. The apparatus (trailer) may allow companies to cut operating costs and focus on their efficiency.

A technical advantage of the apparatus is that the gantry assembly reduces, at least in part, the possibility of the gantry load from becoming freely swung, from side-to-side and/or from front to back while (A) the gantry load is held vertically above the working surface, and (B) the movable frame assembly moves the gantry assembly and the gantry load.

In accordance with a preferred embodiment, the apparatus (trailer) is configured to vertically lift and move machinery, parts, mobile shops, buckets and shovels, small mobile buildings, etc. In accordance with a preferred embodiment, a sliding hydraulic gantry system is mounted (built) on top of the movable frame, and is configured to vertically lift loads up and down. Once the gantry load is secured, the frame may be moved (transported). The apparatus may be pulled by a prime mover (such as a rock truck, etc.). The apparatus is configured to be backed overtop of the gantry load. Preferably, by the use of a self-contained hydraulic system that is activated by a remote control, the gantry load may be securely connected to the overhead gantry. The gantry load may then be secured by the use of four hydraulic recovery winches and a stabilizing push bumper to reduce the potential of swing for relatively larger gantry loads. The gantry load may then be transported from one location to another, and put down for maintenance, repairs, or storage. The apparatus can lift relatively larger loads of most shapes and sizes that fit within the movable frame.

Other aspects are identified in the claims.

Other aspects and features of the non-limiting embodiments may now become apparent to those skilled in the art upon review of the following detailed description of the non-limiting embodiments with the accompanying drawings.

This Summary is provided to introduce concepts in simplified form that are further described below in the Detailed Description. This Summary is not intended to identify key features or essential features of the disclosed or claimed subject matter, and is not intended to describe each disclosed embodiment or every implementation of the disclosed subject matter. Many other novel advantages, features, and relationships will become apparent as this description proceeds. The figures and the description that follow more particularly exemplify illustrative embodiments.

BRIEF DESCRIPTION OF THE DRAWINGS

The non-limiting embodiments may be more fully appreciated by reference to the following detailed description of the non-limiting embodiments when taken in conjunction with the accompanying drawings, in which.

Figure 1:
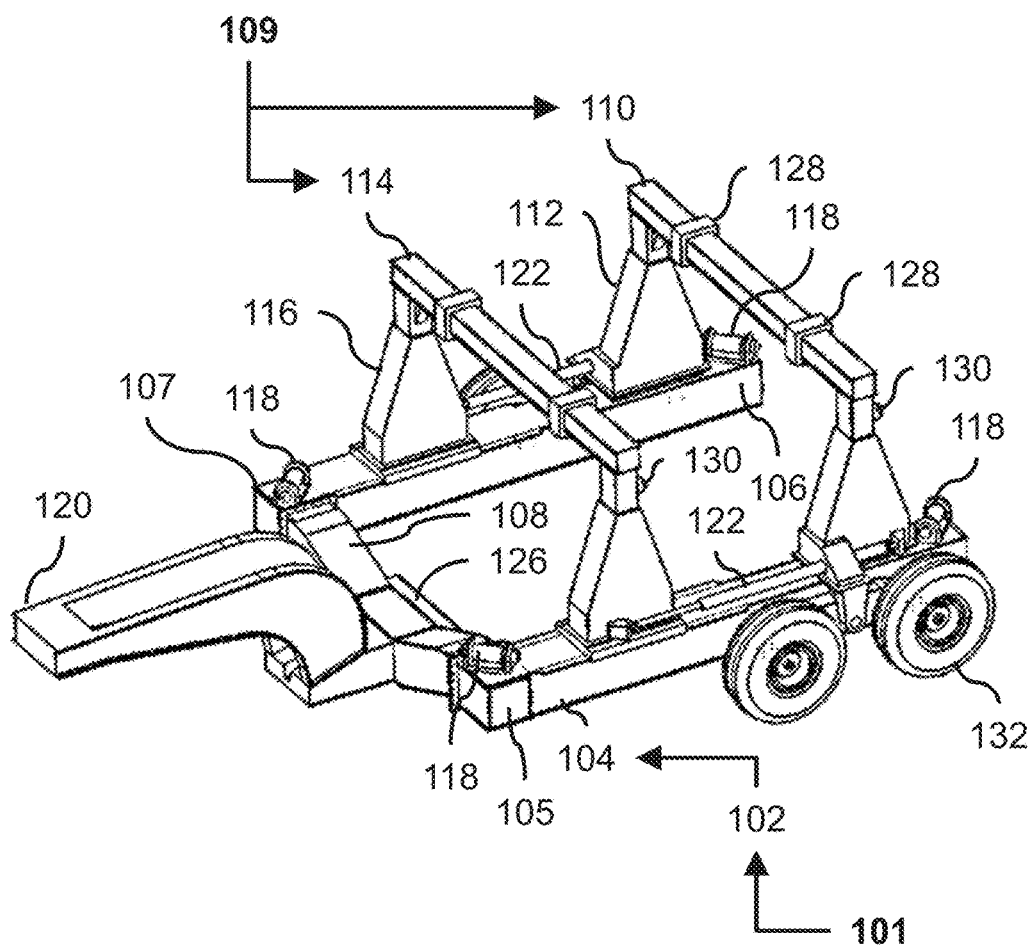
FIGS. 1 and 2 depict perspective views of embodiments of an apparatus including a height-adjustable gantry assembly and a movable frame assembly.

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted.

Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, but well-understood, elements that are useful or necessary in commercially feasible embodiments are often not depicted to provide a less obstructed view of the embodiments of the present disclosure.

LISTING OF REFERENCE NUMERALS USED IN THE DRAWINGS

101 movable frame assembly
102 movable U-shaped frame, or U-shaped frame
104 first elongated member
105 first end section
106 second elongated member
107 second end section
108 frame-connection member
109 gantry assembly, or height-adjustable gantry assembly
110 first gantry, or first height-adjustable inverted U-shaped gantry
112 first spaced-apart telescopic legs, or first telescopic legs
114 second gantry, or second height-adjustable inverted U-shaped gantry
116 second spaced-apart telescopic legs, or second telescopic legs
118 winch assembly
120 neck attachment
122 gantry slide actuator
124 gantry-lift actuator
126 dampening bumper
128 lift point, or spaced apart lift points
130 lock
132 tires
134 lift-point actuator
136 walking beam suspension
900 gantry load
901 working surface
902 prime mover
903 anti-swing line
905 lift line

DETAILED DESCRIPTION OF THE NON-LIMITING EMBODIMENT(S)

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of may be defined by the claims (in which the claims may be amended during patent examination after filing of this application). For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described.

Figure 2:
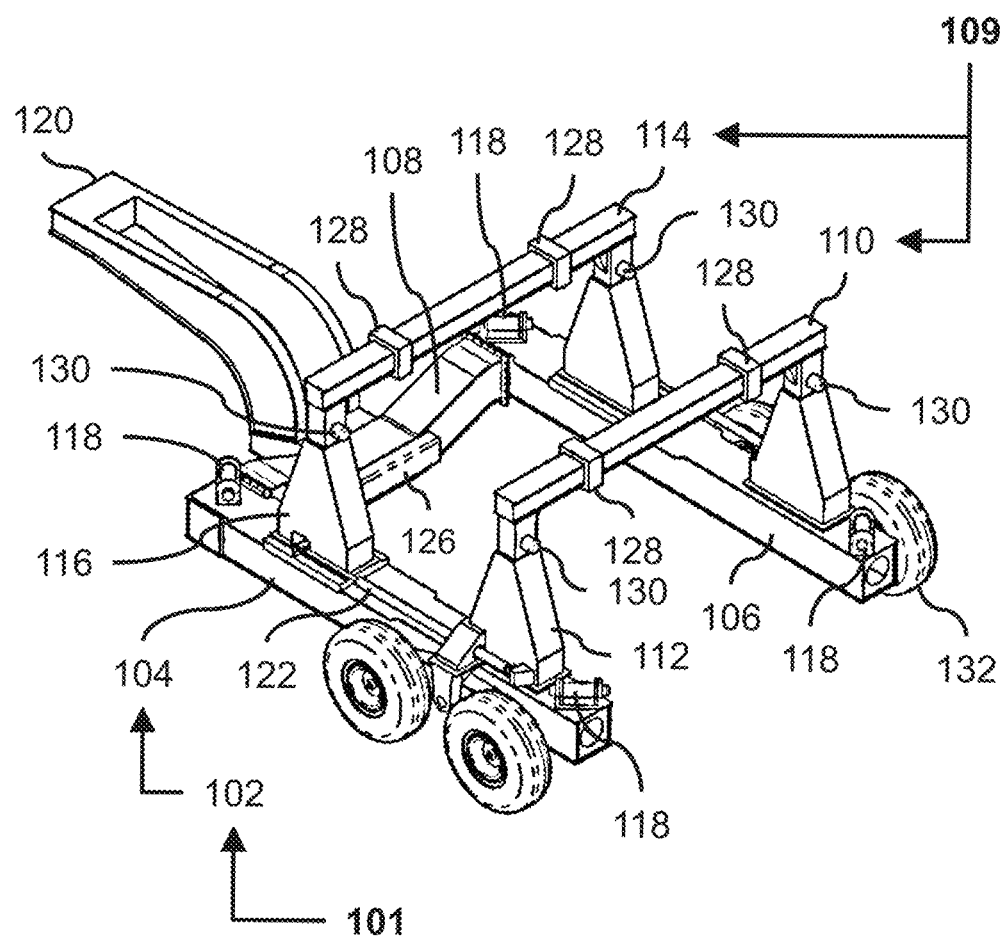

FIGS. 1 and 2 depict perspective views of embodiments of an apparatus including (and not limited to) a synergistic combination of a height-adjustable gantry assembly 109 and a movable frame assembly 101. Hereafter, the height-adjustable gantry assembly 109 is referred to as the gantry assembly 109.

Figure 4:
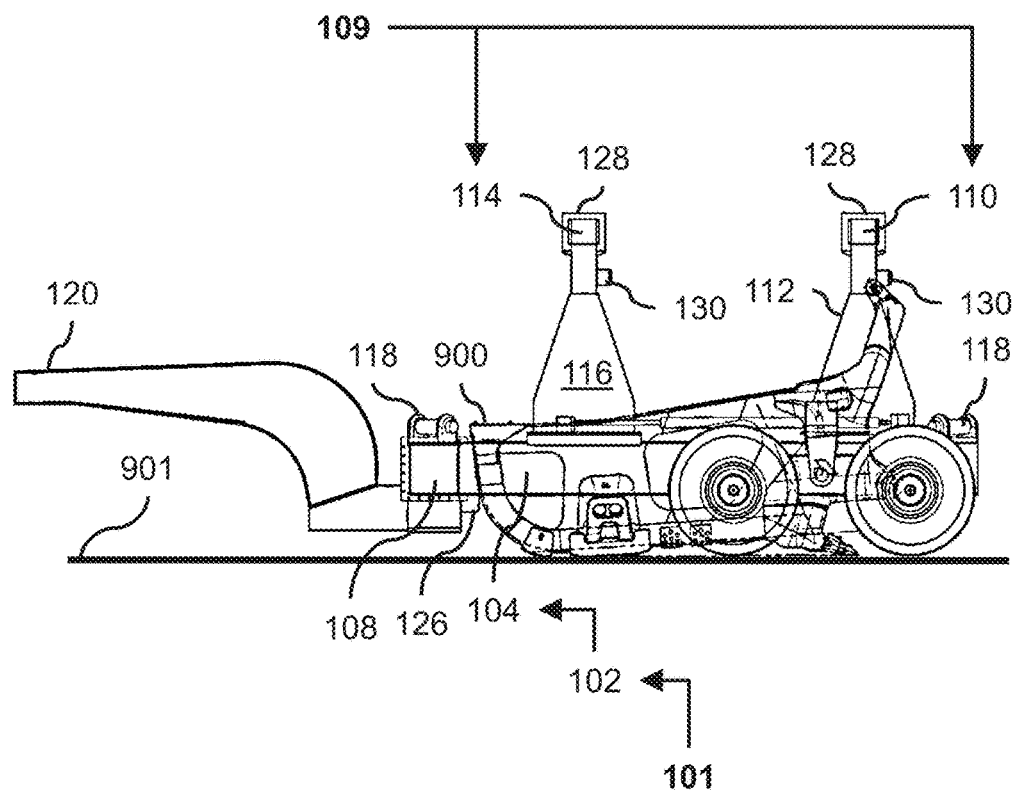
Figure 7:
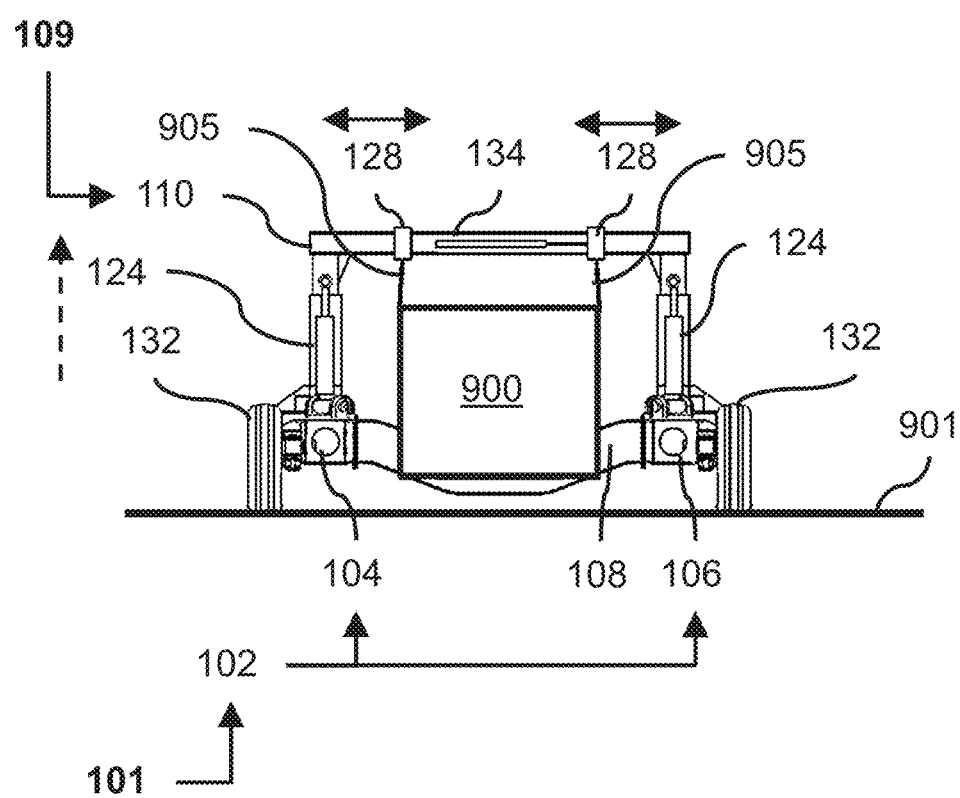
Figure 8:
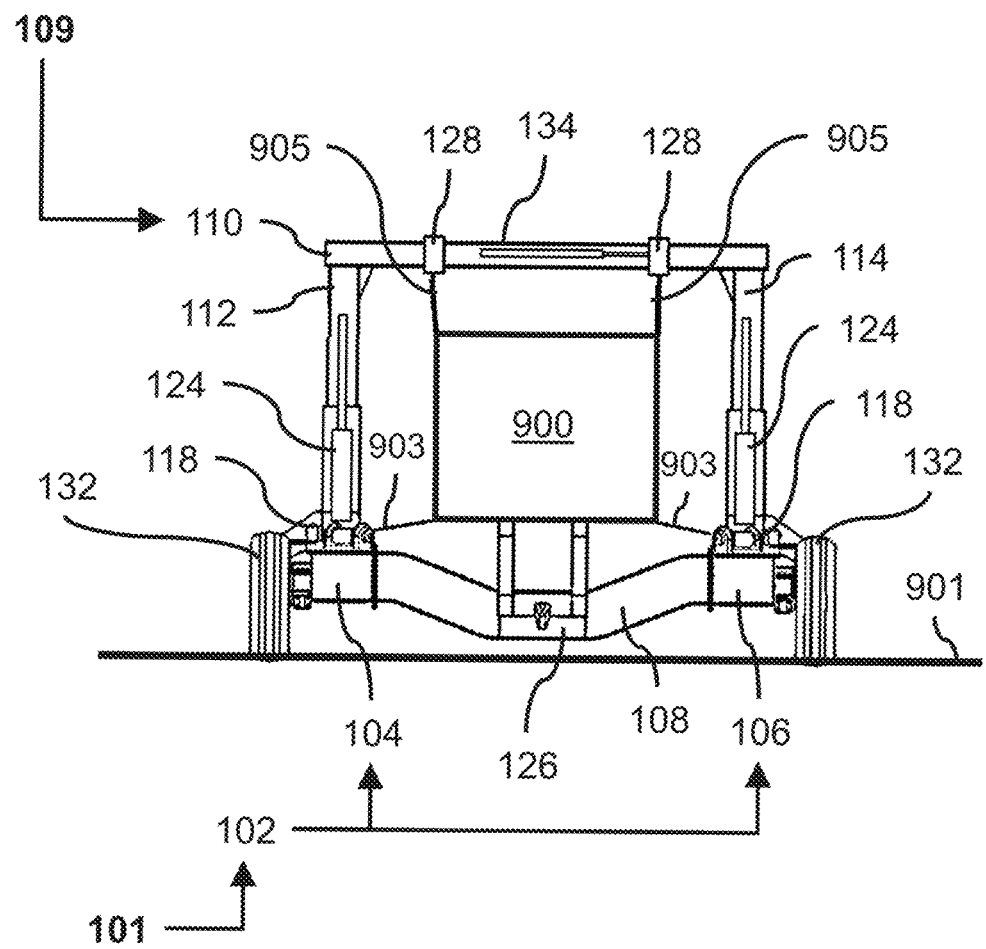

The gantry assembly 109 is configured to be mounted (preferably, securely connected, securely fixedly mounted, securely selectively coupled to, or affixed to, either directly or indirectly) a gantry load 900 that is resting (either directly or indirectly) on a working surface 901 (as depicted in FIGS. 4, 7 and 8).

Preferably, the gantry assembly 109 includes structural steel beams that are welded together, etc.

Embodiments of the gantry load 900 are depicted in FIGS. 4, 7, 8 and 10.

The gantry assembly 109 is also configured to be height adjusted (height adjustable, either directly or indirectly). This is done in such a way that the gantry assembly 109, in use, lifts and supports (either directly or indirectly) the gantry load 900 vertically above the working surface 901 once the gantry assembly 109 is securely connected (either directly or indirectly) to the gantry load 900 (as depicted in FIGS. 7 and 8).

The movable frame assembly 101 is configured to move and support (either directly or indirectly) the gantry assembly 109. This is done in such a way that the movable frame assembly 101 moveably supports (either directly or indirectly) the gantry assembly 109 and the gantry load 900 once (A) the movable frame assembly 101 has moved the gantry assembly 109 proximate to the gantry load 900 (as depicted in FIGS. 7 and 8), and (B) the gantry assembly 109 is securely connected (either directly or indirectly) to the gantry load 900 (as depicted in FIGS. 7 and 8).

Preferably, the movable frame assembly 101 includes structural steel beams that are welded together, etc.

The gantry assembly 109 is also configured to maintain (either directly or indirectly) the gantry load 900 in a substantially stationary position relative to the movable frame assembly 101 once the movable frame assembly 101 is made to move relative to the working surface 901 (as depicted in FIGS. 7 and 8).

A technical advantage of the apparatus is that the gantry assembly 109 reduces, at least in part, the possibility of the gantry load 900 from becoming freely swung, from side-to-side and/or from front to back while (A) the gantry load 900 is held vertically above the working surface 901, and (B) the movable frame assembly 101 moves the gantry assembly 109 and the gantry load 900.

Figure 3:
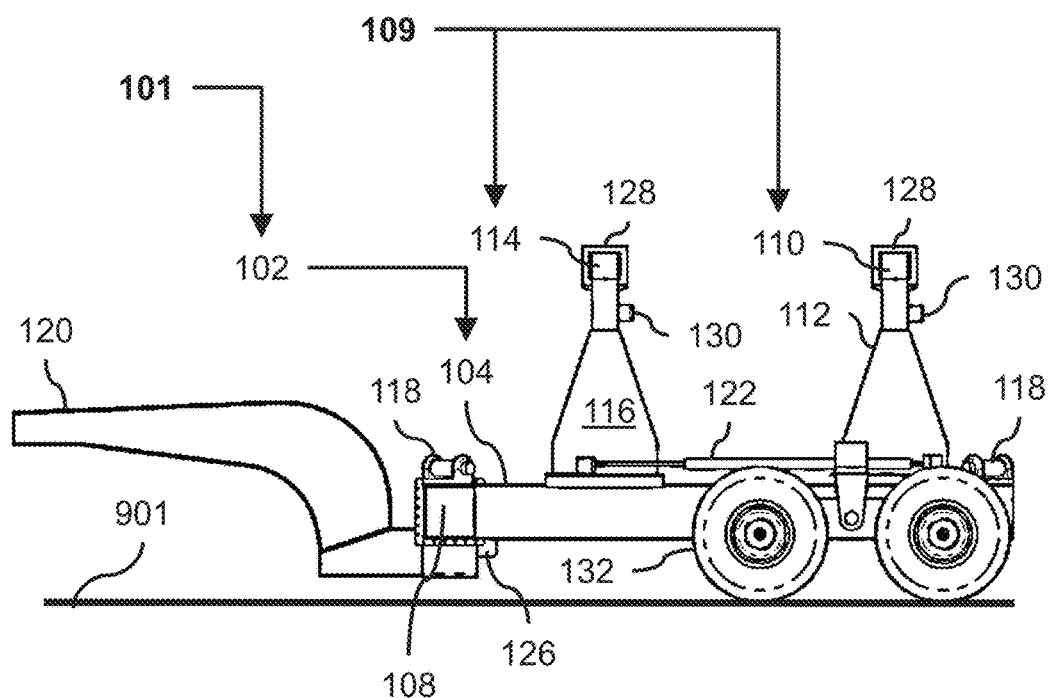
FIGS. 3, 4 and 5 depict side views of embodiments of the apparatus of FIG. 1.
Figure 5:
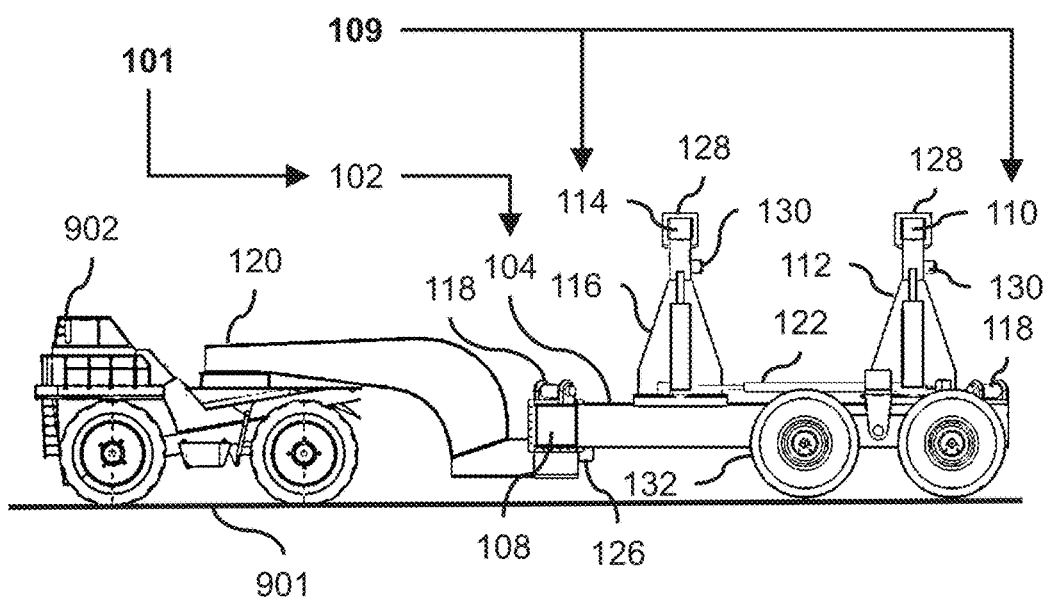

FIGS. 3, 4 and 5 depict side views of embodiments of the apparatus of FIG. 1.

Referring to the embodiment as depicted in FIG. 4, the movable frame assembly 101 preferably includes a movable U-shaped frame 102 (hereafter referred to as the U-shaped frame 102) is configured to be moved in such a way that the gantry assembly 109 is vertically positioned above the gantry load 900. The gantry assembly 109 is configured to be securely selectively connected to (either directly or indirectly) the gantry load 900 resting (either directly or indirectly) on a working surface 901 (once the U-shaped frame 102 is moved so that gantry assembly 109 is vertically positioned above the gantry load 900). The gantry assembly 109 is configured to lift (vertically lift) the gantry load 900 relative to the working surface 901, once the gantry assembly 109 is securely selectively connected to the gantry load 900. The gantry assembly 109 is configured to move the gantry load 900 horizontally relative to the working surface 901, once the gantry assembly 109 has vertically lifted the gantry load 900 above the working surface 901. Preferably, the U-shaped frame 102 surrounds the gantry load 900 along three sides (the front side and lateral opposite sides), while leaving the back side open an accessible.

Figure 6:
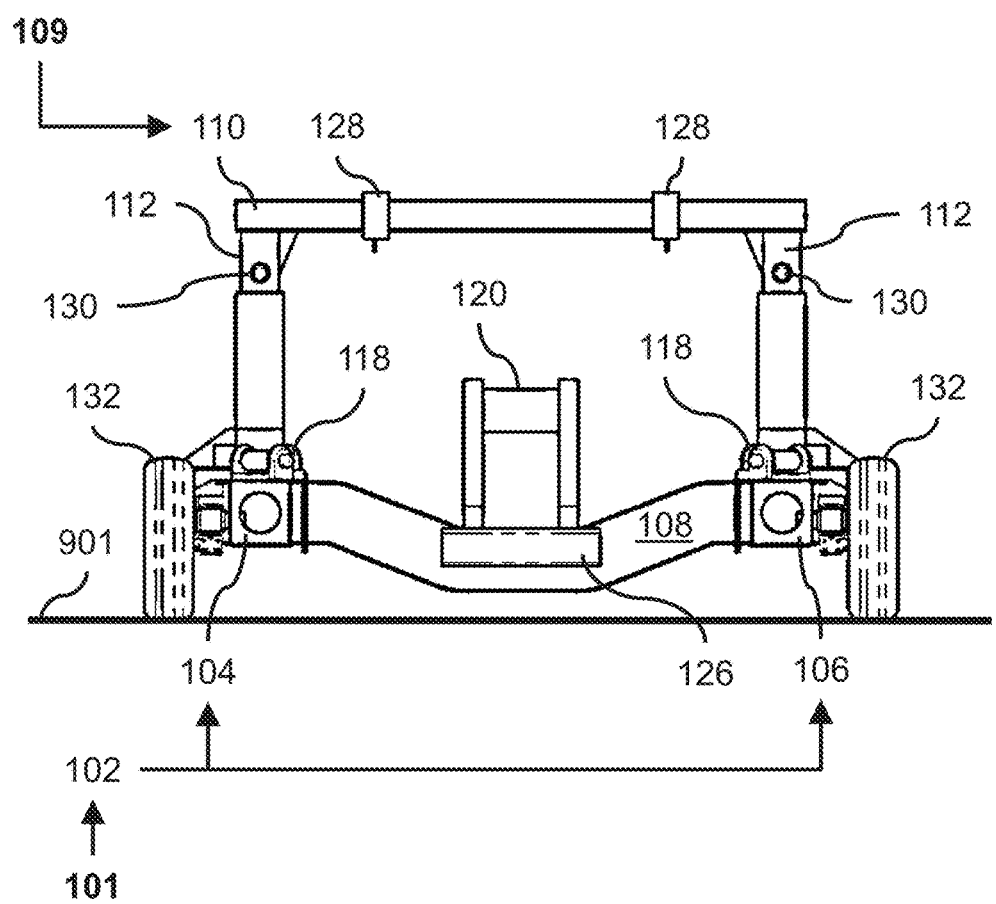
FIGS. 6, 7 and 8 depict end views of embodiments of the apparatus of FIG. 1.

FIGS. 6, 7 and 8 depict end views of embodiments of the apparatus of FIG. 1.

Referring to the embodiment as depicted in FIG. 7 (a view from the backside), the U-shaped frame 102 was moved in such a way that the gantry assembly 109 is vertically positioned above the gantry load 900. The gantry assembly 109 was securely selectively connected to the gantry load 900 resting, and then the gantry assembly 109 lifted the gantry load 900 above the working surface 901. Specifically, a lift point 128 of the gantry assembly 109 was fixedly connected to a lift line 905 that is fixedly connected to a top portion of the gantry load 900.

Referring to the embodiment as depicted in FIG. 8, the U-shaped frame 102 includes a winch assembly 118 configured to haul in an anti-swing line 903 that is connected to a bottom section of the gantry load 900. This is done in such a way that the winch assembly 118, in use, reduces, at least in part, swinging side-to-side movement of the gantry load 900.

Figure 9:
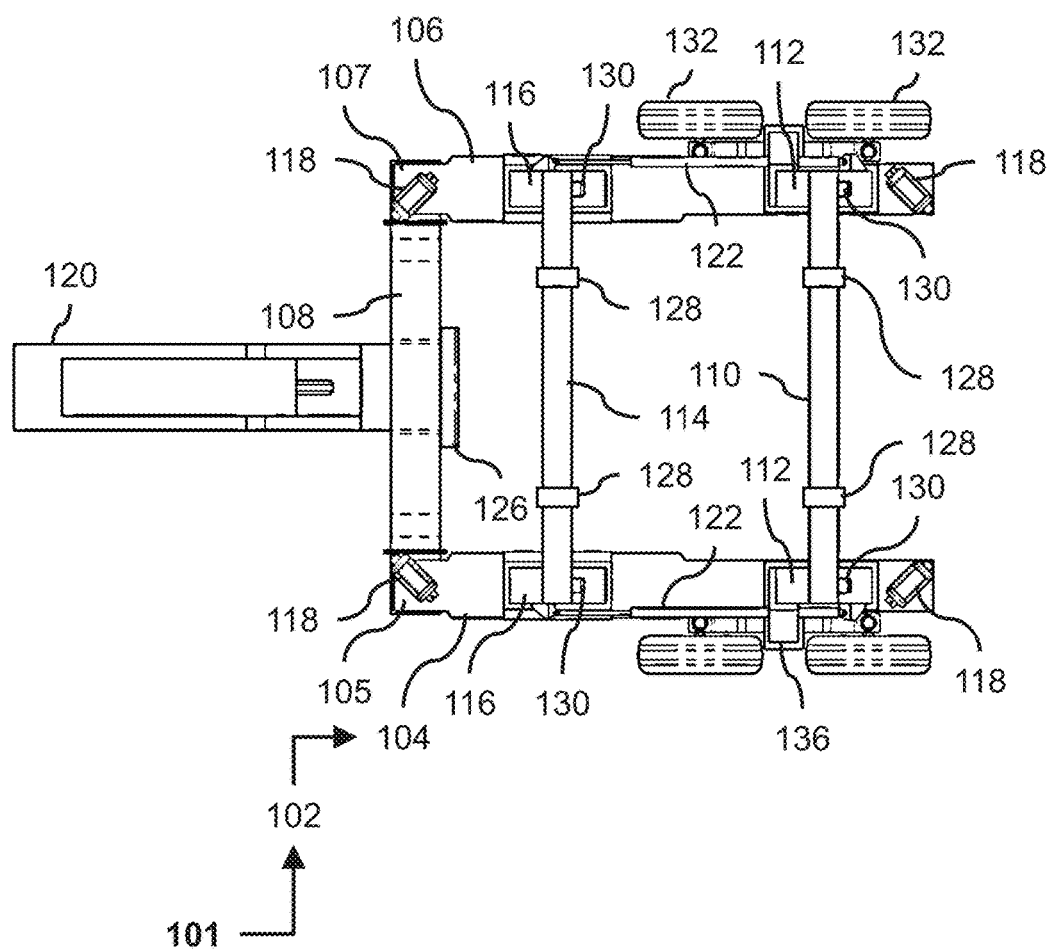
FIGS. 9 and 10 depict top views of embodiments of the apparatus of FIG. 1.
Figure 10:
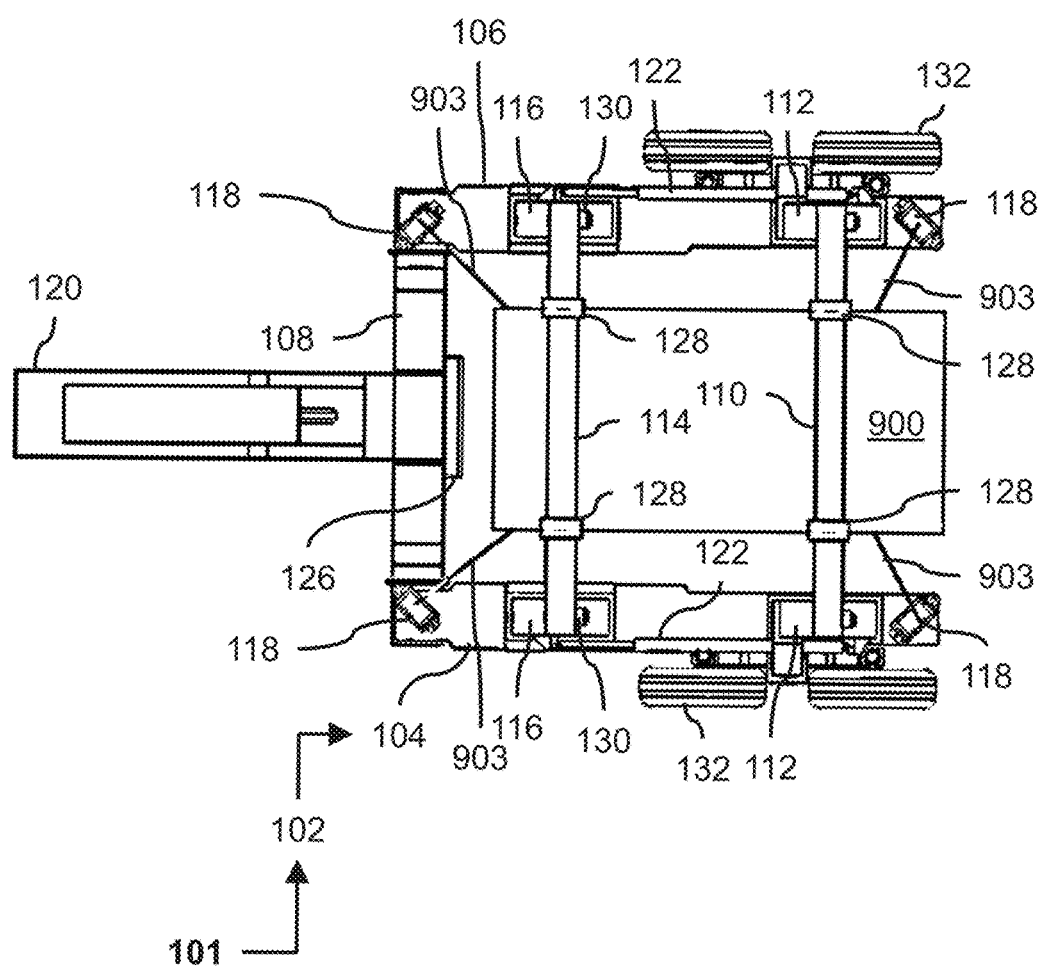

FIGS. 9 and 10 depict top views of embodiments of the apparatus of FIG. 1. The U-shaped frame 102 surrounds the gantry load 900 along three sides (the front side and lateral opposite sides), while leaving the back side open an accessible.

Referring to the embodiments as depicted in FIGS. 1 and 2, the apparatus is adapted such that the movable frame assembly 101 preferably includes (and is not limited to) a movable U-shaped frame 102.

The gantry assembly 109 preferably includes a first height-adjustable inverted U-shaped gantry 110 that is supported (either directly or indirectly) by the movable U-shaped frame 102. This is done in such a way that the first height-adjustable inverted U-shaped gantry 110 is movable by the movable U-shaped frame 102. Hereafter, the first height-adjustable inverted U-shaped gantry 110 is referred to as the first gantry 110.

The gantry assembly 109 also preferably includes a second height-adjustable inverted U-shaped gantry 114 that is supported (either directly or indirectly) by the movable U-shaped frame 102. This is done in such a way that the second height-adjustable inverted U-shaped gantry 114 is movable by the movable U-shaped frame 102. Hereafter, the second height-adjustable inverted U-shaped gantry 114 is referred to as the second gantry 114.

The second gantry 114 is spaced apart from the first gantry 110.

The second gantry 114 and the first gantry 110 are configured to vertically lift and support (either directly or indirectly) the gantry load 900 vertically above the working surface 901, once the U-shaped frame 102 has moved the second gantry 114 and the first gantry 110 proximate to the gantry load 900. This is done in such a way that the second gantry 114 and the first gantry 110 are height adjusted, in use, to vertically lift, support and maintain the gantry load 900 so that the gantry load 900 is in a substantially stationary position relative to the U-shaped frame 102 while the U-shaped frame 102 is made to move relative to the working surface 901. In this manner, the gantry load 900 is less likely to swing freely side-to-side and/or front to back while the gantry load 900 is held vertically above the working surface 901, and while the U-shaped frame 102 is moved.

Preferably, the first gantry 110 and the second gantry 114 are each configured to, in combination, be attached or affixed (either directly or indirectly) to the gantry load 900, and to vertically lift and support the gantry load 900 (support the weight of the gantry load 900).

Preferably, the first gantry 110 and the second gantry 114 each includes a combination of structural steel beams that are welded together, etc.

Preferably, once the first gantry 110 and the second gantry 114, in combination and in use, support (either directly or indirectly) the gantry load 900, the U-shaped frame 102 may be moved by a prime mover 902 (as depicted in FIG. 5).

Referring to the embodiments as depicted in FIGS. 1 and 2, the apparatus is adapted such that the U-shaped frame 102 is configured to be movably supported horizontally above the working surface 901 relative to the gantry load 900. This is done in such a way that the U-shaped frame 102 is movable to position the first gantry 110 and the second gantry 114 proximate to the gantry load 900. In this manner, the first gantry 110 and the second gantry 114, in use, are connectable (either directly or indirectly) to the gantry load 900, and lift the gantry load 900 vertically above the working surface 901 once the first gantry 110 and the second gantry 114 are height adjusted (as depicted in FIGS. 7 and 8).

Referring to the embodiments as depicted in FIGS. 1 and 2, the apparatus is adapted such that the U-shaped frame 102 is configured to be movably supported horizontally above the working surface 901 relative to the gantry load 900. This is done in such a way that the U-shaped frame 102 movably supports the first gantry 110, the second gantry 114 and the gantry load 900 (once the first gantry 110 and the second gantry 114, in use, lift the gantry load 900 vertically above the working surface 901, as depicted in FIGS. 7 and 8).

Referring to the embodiments as depicted in FIGS. 1 and 2, the apparatus is adapted such that the U-shaped frame 102 is configured to be moved to straddle the gantry load 900 once the U-shaped frame 102 is horizontally moved, along the working surface 901, to the gantry load 900 (as depicted in FIGS. 7 and 8).

Referring to the embodiments as depicted in FIGS. 1 and 2, the apparatus is adapted such that the U-shaped frame 102 includes (and is not limited to) a first elongated member 104 having a first end section 105.

The U-shaped frame 102 also includes a second elongated member 106 having a second end section 107.

The second elongated member 106 is held in a spaced-apart, side-by-side relationship relative to the first elongated member 104.

The first end section 105 and the second end section 107 are spaced apart.

The U-shaped frame 102 also includes a frame-connection member 108 connecting the first end section 105 of the first elongated member 104 with the second end section 107 of the second elongated member 106.

Preferably, the first elongated member 104 includes structural steel beam, etc. Preferably, the second elongated member 106 includes structural steel beam, etc. Preferably, the frame-connection member 108 connects (preferably, securely and fixedly connects) the first end section 105 of the first elongated member 104 with the second end section 107 of the second elongated member 106. Preferably, the frame-connection member 108 includes a structural steel beam, etc. The frame-connection member 108 spans perpendicularly between the first end section 105 of the first elongated member 104 and the second end section 107 of the second elongated member 106.

Preferably, the first gantry 110 is affixed to, and spans across, the first elongated member 104 and the second elongated member 106.

Preferably, the first gantry 110 is securely connected (affixed) to the first elongated member 104 and the second elongated member 106 in such a way that the first gantry 110 is not movable relative to the first elongated member 104 and the second elongated member 106.

Preferably, the second gantry 114 is linearly slidable lengthwise along the first elongated member 104 and the second elongated member 106.

Referring to the embodiments as depicted in FIGS. 1 and 2, the apparatus is adapted such that the first gantry 110 is coupled to, and extends between, the first elongated member 104 and the second elongated member 106.

The first gantry 110 has first spaced-apart telescopic legs 112 respectively permanently mounted (affixed) to the first elongated member 104 and the second elongated member 106. Hereafter, the first spaced-apart telescopic legs 112 are referred to as the first telescopic legs 112.

Preferably, the first telescopic legs 112 are configured to telescopically extend along an extension axis extending through each of the first telescopic legs 112.

Referring to the embodiments as depicted in FIGS. 1 and 2, the apparatus is adapted such that the second gantry 114 is held in a spaced-apart, side-by-side relationship relative to the first gantry 110.

The second gantry 114 is slidably coupled to, and extends between, the first elongated member 104 and the second elongated member 106.

The second gantry 114 has second spaced-apart telescopic legs 116 respectively resting on the first elongated member 104 and the second elongated member 106. The second gantry 114 is movable lengthwise along the first elongated member 104 and the second elongated member 106. Hereafter, the second spaced-apart telescopic legs 116 are referred to as the second telescopic legs 116.

Preferably, the second telescopic legs 116 are configured to telescopically extend along an extension axis extending through each of the second telescopic legs 116.

Preferably, the second telescopic legs 116 are respectively slidably coupled to the first elongated member 104 and the second elongated member 106 in such a way that the second telescopic legs 116 are slidable along a length of the first elongated member 104 and the second elongated member 106.

Referring to the embodiments as depicted in FIGS. 1 and 2, the apparatus further includes a gantry slide actuator 122 that is fixedly mounted to the movable frame assembly 101. The gantry slide actuator 122 is coupled to the height-adjustable gantry assembly 109. The gantry slide actuator 122 is configured to actuatably move the height-adjustable gantry assembly 109 relative to the movable frame assembly 101 along a horizontal direction.

Preferably, the gantry slide actuator 122 includes a hydraulic cylinder or an electric motor, etc.

The movable frame assembly 101 is positioned proximate to the gantry load 900, so that the height-adjustable gantry assembly 109 becomes positioned proximate to the gantry load 900. The movable frame assembly 101 is placed in a substantially stationary position relative to the working surface 901. The gantry slide actuator 122 is then actuated to move the height-adjustable gantry assembly 109 relative to the gantry load 900 (if so desired for improved positioning of the height-adjustable gantry assembly 109 relative to the gantry load 900 while the movable frame assembly 101 remains stationary). The gantry load 900 is affixed to the height-adjustable gantry assembly 109 while the movable frame assembly 101 is held in a substantially stationary position. The movable frame assembly 101 is then moved once the gantry load 900 is affixed to, and lifted by, the height-adjustable gantry assembly 109, and in this manner the gantry load 900 may be moved to a desired location.

In accordance with a preferred embodiment, as depicted in FIGS. 1 and 2, the apparatus further includes gantry slide actuators 122 that are fixedly mounted to the movable U-shaped frame 102. The gantry slide actuators 122 are coupled to (affixed to) the second gantry 114. The gantry slide actuators 122 are configured to actuatably move, in use, the second gantry 114 relative to the movable frame assembly 101 along a horizontal direction (the second gantry 114 is movable or slide movable).

The U-shaped frame 102 is positioned proximate to the gantry load 900, so that the second gantry 114 becomes positioned proximate to the gantry load 900. The U-shaped frame 102 is placed in a substantially stationary position relative to the working surface 901. The gantry slide actuator 122 is then actuated to move the second gantry 114 relative to the gantry load 900 and relative to the first gantry 110 (if so desired for improved positioning of the second gantry 114 relative to the gantry load 900 while the U-shaped frame 102 remains stationary). The gantry load 900 is affixed to the second gantry 114 while the U-shaped frame 102 is held in a substantially stationary position. The U-shaped frame 102 is then moved once the gantry load 900 is affixed to, and lifted by, the second gantry 114 and the first gantry 110 (and in this manner the gantry load 900 may be moved to a desired location).

Referring to the embodiments as depicted in FIGS. 1 and 2, the apparatus further includes a winch assembly 118. In accordance with a general embodiment, the winch assembly 118 is coupled (directly or indirectly) to the movable frame assembly 101. In accordance with a specific embodiment, the winch assembly 118 is bias connected (via a spring or a dampener) to the movable frame assembly 101. In accordance with another specific embodiment, the winch assembly 118 is fixedly mounted to the movable frame assembly 101. The winch assembly 118 is configured to haul in an anti-swing line 903 (as depicted in FIG. 8) that is connected to a bottom section of the gantry load 900. This is done in such a way that the winch assembly 118, in use, reduces, at least in part, swinging side-to-side movement of the gantry load 900.

The movable frame assembly 101 is placed in a substantially stationary position relative to the working surface 901, in which the gantry load 900 may be attached to, and lifted by the height-adjustable gantry assembly 109. The winch assembly 118 is attached to the anti-swing line 903 (as depicted in FIG. 8) that is connected to the bottom section of the gantry load 900. The winch assembly 118, in use, hauls in the anti-swing line 903 until the anti-swing line 903 is tight. In this manner, swinging or side-to-side movement of the gantry load 900 may be reduced.

In accordance with a preferred embodiment, as depicted in FIGS. 1 and 2, the apparatus further includes winch assemblies 118 fixedly mounted to (preferably, coupled to) the movable U-shaped frame 102. The winch assemblies 118 are configured to haul in respective anti-swing lines 903 that are connected to a bottom section of the gantry load 900. This is done in such a way that the winch assemblies 118, in use, reduce, at least in part, swinging side-to-side movement of the gantry load 900.

The movable U-shaped frame 102 is placed in a substantially stationary position relative to the working surface 901, in which the gantry load 900 may be attached to, and lifted by, the first gantry 110 and the second gantry 114. The winch assemblies 118 are respectively attached to anti-swing lines 903 (as depicted in FIG. 8) that are connected to respective corner sections (the bottom section) of the gantry load 900. The winch assemblies 118, in use, haul in the anti-swing lines 903 until the anti-swing lines 903 are tight. In this manner, swinging or side-to-side movement of the gantry load 900 may be reduced.

Referring to the embodiments as depicted in FIGS. 1 and 2, the apparatus further includes a lift point 128 that is slide mounted to, and slidable along, the height-adjustable gantry assembly 109. The lift point 128 is configured to be fixedly connected to a lift line 905 (as depicted in FIGS. 7 and 8) that is fixedly connected to a top portion of the gantry load 900.

In accordance with a preferred embodiment, as depicted in FIGS. 1 and 2, the apparatus further includes lift points 128 (spaced apart lift points 128) that are respectively slide mounted to, and slidable along, the first gantry 110 and also along the second gantry 114. The lift points 128 are configured to be receptively fixedly connected to the lift lines 905 (as depicted in FIGS. 7 and 8) that are fixedly connected to a top portion of the gantry load 900. Preferably, the lift points 128, in use, are respectively fixedly connected to the lift lines 905 (as depicted in FIGS. 7 and 8) that are fixedly connected to respective corner sections of the top portion of the gantry load 900.

Referring to the embodiments as depicted in FIGS. 7 and 8, the apparatus further includes a lift-point actuator 134 that is affixed to the height-adjustable gantry assembly 109 and to the lift point 128. The lift-point actuator 134 is also coupled to the lift point 128. The lift-point actuator 134 is configured to move the lift point 128 along a horizontal direction relative to the working surface 901.

Preferably, the lift-point actuator 134 includes a hydraulic cylinder or an electric motor, etc.

In accordance with a preferred embodiment, as depicted in FIGS. 1 and 2, the apparatus further includes lift-point actuators 134 that are respectively affixed to the first gantry 110 and to the lift points 128 mounted to the first gantry 110.

The lift-point actuators 134 are also respectively affixed to the second gantry 114 and to the lift points 128 mounted to the second gantry 114.

The lift-point actuators 134 are configured to, respectively, move the lift points 128 along a horizontal direction relative to the working surface 901.

Referring to the embodiments as depicted in FIGS. 7 and 8, the apparatus further includes a gantry-lift actuator 124 that is affixed to the movable frame assembly 101. The gantry-lift actuator 124 is also coupled to the height-adjustable gantry assembly 109. The gantry-lift actuator 124 is configured to move a portion of the height-adjustable gantry assembly 109 having the lift point 128 along a vertical direction relative to the working surface 901.

Preferably, the gantry-lift actuator 124 includes a hydraulic cylinder or an electric motor, etc.

In accordance with a preferred embodiment, as depicted in FIGS. 1 and 2, the apparatus further includes gantry-lift actuators 124 that are affixed to the movable U-shaped frame 102. The gantry-lift actuators 124 are also respectively coupled to the first gantry 110 and also to the second gantry 114. The gantry-lift actuators 124 are configured to move respective portions of (A) the first gantry 110 having the lift points 128 along a vertical direction relative to the working surface 901, and (B) the second gantry 114 having the lift points 128 along a vertical direction relative to the working surface 901.

Preferably, the gantry-lift actuators 124 are configured to telescopically extend the first telescopic legs 112 and the second telescopic legs 116.

Referring to the embodiments as depicted in FIG. 6, the apparatus further includes a lock 130 that is mounted to the height-adjustable gantry assembly 109. The lock 130 is configured to securely lock the height-adjustable gantry assembly 109 at a predetermined height above the working surface 901. This is done in such a way that the lock 130 prevents the height-adjustable gantry assembly 109 from being moved vertically relative to the working surface 901. The lock 130 is a safety feature.

Once the gantry assembly 109 is affixed to the gantry load 900, and lifts the gantry load 900 above the working surface 901, the lock 130 is actuated. In this manner, the lock 130, in use, prevents the gantry assembly 109 from accidentally placing the gantry load 900 back onto the working surface 901 while the movable frame assembly 101 is in motion (travelling along the working surface 901).

In accordance with a preferred embodiment, as depicted in FIGS. 1 and 2, the apparatus further includes locks 130 that are respectively mounted to the first gantry 110 and also to the second gantry 114. The locks 130 are configured to securely lock the first gantry 110 and the second gantry 114 at a predetermined height above the working surface 901. This is done in such a way that the lock 130 prevents the first gantry 110 and the second gantry 114 from vertical movement relative to the working surface 901.

Once the gantry assembly 109 is affixed to the gantry load 900, and the first gantry 110 and also to the second gantry 114 lift the gantry load 900 above the working surface 901, the locks 130 are actuated to prevent the first gantry 110 and also to the second gantry 114 from accidentally placing the gantry load 900 back onto the working surface 901 while the U-shaped frame 102 is in motion (travelling along the working surface 901).

In accordance with a preferred embodiment, as depicted in FIGS. 1 and 2, the apparatus further includes a dampening bumper 126 that is mounted to the movable U-shaped frame 102. The dampening bumper 126 is configured to dampen a reaction force imparted to the gantry load 900 that is supported by the first gantry 110 and the second gantry 114 and by the movable U-shaped frame 102. This is done in response to a sudden braking force that is applied to the movable frame assembly 101.

Preferably, the dampening bumper 126 includes a hydraulic system with nitrogen accumulators configured to dampen a reaction force when suddenly applying the brakes to the movable U-shaped frame 102.

In accordance with a preferred embodiment, as depicted in FIGS. 1 and 2, the apparatus further includes a neck attachment 120 that is fixedly attached (mounted) to the movable frame assembly 101. The neck attachment 120 is configured to be connected to a prime mover 902. Tires 132 are rotatably mounted to the movable frame assembly 101. The tires 132 are configured to facilitate horizontal movement of the movable frame assembly 101 relative to the working surface 901. A walking beam suspension 136 is mounted to the movable frame assembly 101. The walking beam suspension 136 provides a user-working surface for receiving and supporting a user. Preferably, the neck attachment 120 includes a removable gooseneck hitch.

It will be appreciated that the description and/or drawings identify and describe embodiments of the apparatus (either explicitly or non-explicitly). The apparatus may include any suitable combination and/or permutation of the technical features as identified in the detailed description, as may be required and/or desired to suit a particular technical purpose and/or technical function. It will be appreciated, that where possible and suitable, any one or more of the technical features of the apparatus may be combined with any other one or more of the technical features of the apparatus (in any combination and/or permutation). It will be appreciated that persons skilled in the art would know that technical features of each embodiment may be deployed (where possible) in other embodiments even if not expressly stated as such above. It will be appreciated that persons skilled in the art would know that other options would be possible for the configuration of the components of the apparatus to adjust to manufacturing requirements and still remain within the scope as described in at least one or more of the claims. This written description provides embodiments, including the best mode, and also enables the person skilled in the art to make and use the embodiments. The patentable scope may be defined by the claims. The written description and/or drawings may help understand the scope of the claims. It is believed that all the crucial aspects of the disclosed subject matter have been provided in this document. It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

What is claimed is:

1. An apparatus, comprising:
a height-adjustable gantry assembly being configured to be securely connected to a gantry load resting on a working surface; and
the height-adjustable gantry assembly also being configured to be height adjusted in such a way that the height-adjustable gantry assembly, in use, lifts and supports the gantry load vertically above the working surface once the height-adjustable gantry assembly is securely connected to the gantry load; and
a movable frame assembly being configured to move and support the height-adjustable gantry assembly in such a way that the movable frame assembly moveably supports the height-adjustable gantry assembly and the gantry load once the movable frame assembly has moved the height-adjustable gantry assembly proximate to the gantry load, and once the height-adjustable gantry assembly is securely connected to the gantry load; and
the height-adjustable gantry assembly also being configured to maintain the gantry load in a substantially stationary position relative to the movable frame assembly once the movable frame assembly is made to move relative to the working surface; and wherein:
the height-adjustable gantry assembly is configured to move the gantry load horizontally relative to the working surface once the height-adjustable gantry assembly has vertically lifted the gantry load above the working surface; and
the movable frame assembly includes a movable U-shaped frame; and
the height-adjustable gantry assembly is configured to be securely selectively connectable to the gantry load resting on the working surface once the movable U-shaped frame is moved so that the height-adjustable gantry assembly is vertically positioned above the gantry load; and
the movable U-shaped frame is configured to be moved in such a way that the height-adjustable gantry assembly is vertically positioned above the gantry load; and
the movable U-shaped frame surrounds the gantry load along three sides including a front side and lateral opposite sides of the gantry load while leaving the back side open and accessible for the gantry load; and
the movable U-shaped frame is configured to be mounted to tires, in which the tires are rotatably mounted to the movable frame assembly, in which the tires are configured to facilitate horizontal movement of the movable frame assembly relative to the working surface; and
the movable U-shaped frame includes:
a first elongated member having a first end section; and
a second elongated member having a second end section, and being held in a spaced-apart, side-by-side relationship relative to the first elongated member; and
a frame-connection member connecting the first end section of the first elongated member with the second end section of the second elongated member; and
a walking beam suspension mounted to opposite sides of the movable U-shaped frame, and in which the walking beam suspension provides a user-working surface for receiving and supporting a user; and
a neck attachment fixedly attached to the movable frame assembly, and in which the neck attachment is configured to be selectively connectable to, and disconnectable from, a prime mover, and in which the neck attachment includes a removable gooseneck hitch; and
a winch assembly mounted to, and supported by, the movable U-shaped frame, and in which the winch assembly is configured to haul in an anti-swing line that is connected to a bottom section of the gantry load in such a way that the winch assembly, in use, reduces, at least in part, swinging side-to-side movement of the gantry load.

2. The apparatus of claim 1, further comprising:
a gantry slide actuator being fixedly mounted to the movable frame assembly, and coupled to the height-adjustable gantry assembly; and
the gantry slide actuator being configured to actuatably move the height-adjustable gantry assembly relative to the movable frame assembly along a horizontal direction.

3. The apparatus of claim 2, further comprising:
a lift point being slide mounted to, and slidable along, the height-adjustable gantry assembly; and the lift point being configured to be fixedly connected to a lift line that is fixedly connected to a top portion of the gantry load.

4. The apparatus of claim 3, further comprising:
a lift-point actuator being affixed to the height-adjustable gantry assembly; and
the lift-point actuator also being coupled to the lift point; and
the lift-point actuator being configured to move the lift point along a horizontal direction relative to the working surface; and
a gantry-lift actuator being affixed to the movable frame assembly, and also being coupled to the height-adjustable gantry assembly; and
the gantry-lift actuator being configured to move a portion of the height-adjustable gantry assembly having the lift point along a vertical direction relative to the working surface.

5. The apparatus of claim 4, further comprising:
a lock being mounted to the height-adjustable gantry assembly; and
the lock being configured to securely lock the height-adjustable gantry assembly at a predetermined height above the working surface in such a way that the lock prevents the height-adjustable gantry assembly from being moved vertically relative to the working surface.

6. The apparatus of claim 1, wherein:
the height-adjustable gantry assembly includes:
a first height-adjustable inverted U-shaped gantry being supported by the movable U-shaped frame in such a way that the first height-adjustable inverted U-shaped gantry is movable by the movable U-shaped frame; and
a second height-adjustable inverted U-shaped gantry being supported by the movable U-shaped frame in such a way that the second height-adjustable inverted U-shaped gantry is movable by the movable U-shaped frame; and
the second height-adjustable inverted U-shaped gantry being spaced apart from the first height-adjustable inverted U-shaped gantry.

7. The apparatus of claim 6, wherein:
the second height-adjustable inverted U-shaped gantry and the first height-adjustable inverted U-shaped gantry are configured to vertically lift and support the gantry load vertically above the working surface, once the movable U-shaped frame has moved the second height-adjustable inverted U-shaped gantry and the first height-adjustable inverted U-shaped gantry proximate to the gantry load, in such a way that the second height-adjustable inverted U-shaped gantry and the first height-adjustable inverted U-shaped gantry are height adjusted, in use, to vertically lift, support and maintain the gantry load so that the gantry load is stationary relative to the movable U-shaped frame while the movable U-shaped frame is made to move relative to the working surface, and so that the gantry load is less likely to swing side-to-side and front to back while the gantry load is held vertically above the working surface.

8. The apparatus of claim 6, wherein:
the movable U-shaped frame is configured to be moveably supported horizontally above the working surface relative to the gantry load in such a way that the movable U-shaped frame is movable to position the first height-adjustable inverted U-shaped gantry and the second height-adjustable inverted U-shaped gantry proximate to the gantry load so that the first height-adjustable inverted U-shaped gantry and the second height-adjustable inverted U-shaped gantry, in use, are connectable to the gantry load, and lift the gantry load vertically above the working surface once the first height-adjustable inverted U-shaped gantry and the second height-adjustable inverted U-shaped gantry are height adjusted.

9. The apparatus of claim 8, wherein:
the movable U-shaped frame is configured to be moveably supported horizontally above the working surface relative to the gantry load in such a way that the movable U-shaped frame moveably supports the first height-adjustable inverted U-shaped gantry, the second height-adjustable inverted U-shaped gantry and the gantry load once the first height-adjustable inverted U-shaped gantry and the second height-adjustable inverted U-shaped gantry, in use, lift the gantry load vertically above the working surface.

10. The apparatus of claim 9, wherein:
the movable U-shaped frame is configured to be moved to straddle the gantry load once the movable U-shaped frame is horizontally moved, along the working surface, to the gantry load.

11. The apparatus of claim 6, wherein:
the first height-adjustable inverted U-shaped gantry is coupled to, and extends between, the first elongated member and the second elongated member; and
the first height-adjustable inverted U-shaped gantry has first spaced-apart telescopic legs respectively permanently mounted to the first elongated member and the second elongated member.

12. The apparatus of claim 11, wherein:
the second height-adjustable inverted U-shaped gantry is held in the spaced-apart, side-by-side relationship relative to the first height-adjustable inverted U-shaped gantry; and
the second height-adjustable inverted U-shaped gantry is slidably coupled to, and extends between, the first elongated member and the second elongated member; and
the second height-adjustable inverted U-shaped gantry has second spaced-apart telescopic legs respectively resting on the first elongated member and the second elongated member, and the second height-adjustable inverted U-shaped gantry being movable lengthwise along the first elongated member and the second elongated member.

13. The apparatus of claim 6, further comprising:
gantry slide actuators being fixedly mounted to the movable U-shaped frame, and coupled to the second height-adjustable inverted U-shaped gantry, in which the second height-adjustable inverted U-shaped gantry is movable; and
the gantry slide actuators being configured to actuatably move the second height-adjustable inverted U-shaped gantry relative to the movable frame assembly along a horizontal direction.

14. The apparatus of claim 13, further comprising:
winch assemblies being coupled to the movable U-shaped frame; and
the winch assemblies being configured to haul in respective anti-swing lines that are connected to the bottom section of the gantry load in such a way that the winch assemblies, in use, reduce, at least in part, swinging side-to-side movement of the gantry load.

15. The apparatus of claim 14, further comprising:

lift points being respectively slide mounted to, and slidable along, the first height-adjustable inverted U-shaped gantry and also along the second height-adjustable inverted U-shaped gantry; and the lift points are configured to be receptively fixedly connected to lift lines that are fixedly connected to a top portion of the gantry load.

16. The apparatus of claim 15, further comprising:

lift-point actuators being respectively affixed to the first height-adjustable inverted U-shaped gantry and to the lift points mounted to the first height-adjustable inverted U-shaped gantry; and the lift-point actuators also being respectively affixed to the second height-adjustable inverted U-shaped gantry and to the lift points mounted to the second height-adjustable inverted U-shaped gantry; and the lift-point actuators being configured to, respectively, move the lift points along the horizontal direction relative to the working surface; and gantry-lift actuators being affixed to the movable U-shaped frame, and also being respectively coupled to the first height-adjustable inverted U-shaped gantry and the second height-adjustable inverted U-shaped gantry; and the gantry-lift actuators being configured to move respective portions of the first height-adjustable inverted U-shaped gantry having the lift points along a vertical direction relative to the working surface; and the gantry-lift actuators also being configured to move respective portions of the second height-adjustable inverted U-shaped gantry having the lift points along the vertical direction relative to the working surface.

17. The apparatus of claim 16, further comprising:

locks being respectively mounted to the first height-adjustable inverted U-shaped gantry and the second height-adjustable inverted U-shaped gantry; and the locks being configured to securely lock the first height-adjustable inverted U-shaped gantry and the second height-adjustable inverted U-shaped gantry at a predetermined height above the working surface in such a way that the lock prevents the first height-adjustable inverted U-shaped gantry and the second height-adjustable inverted U-shaped gantry from vertical movement relative to the working surface.

18. The apparatus of claim 17, further comprising:

a dampening bumper being mounted to the movable U-shaped frame; and the dampening bumper being configured to dampen a reaction force imparted to the gantry load that is supported by the first height-adjustable inverted U-shaped gantry and the second height-adjustable inverted U-shaped gantry and by the movable U-shaped frame in response to a sudden braking force that is applied to the movable frame assembly.

* * * * *